July 2, 1963

E. S. GANDRUD 3,096,004

HOPPER AND FEEDING ROTOR STRUCTURE FOR DISPENSERS
OF GRANULAR MATERIAL

Filed July 14, 1961

INVENTOR.
EBENHARD S. GANDRUD
BY
Merchant, Merchant & Gould
ATTORNEYS

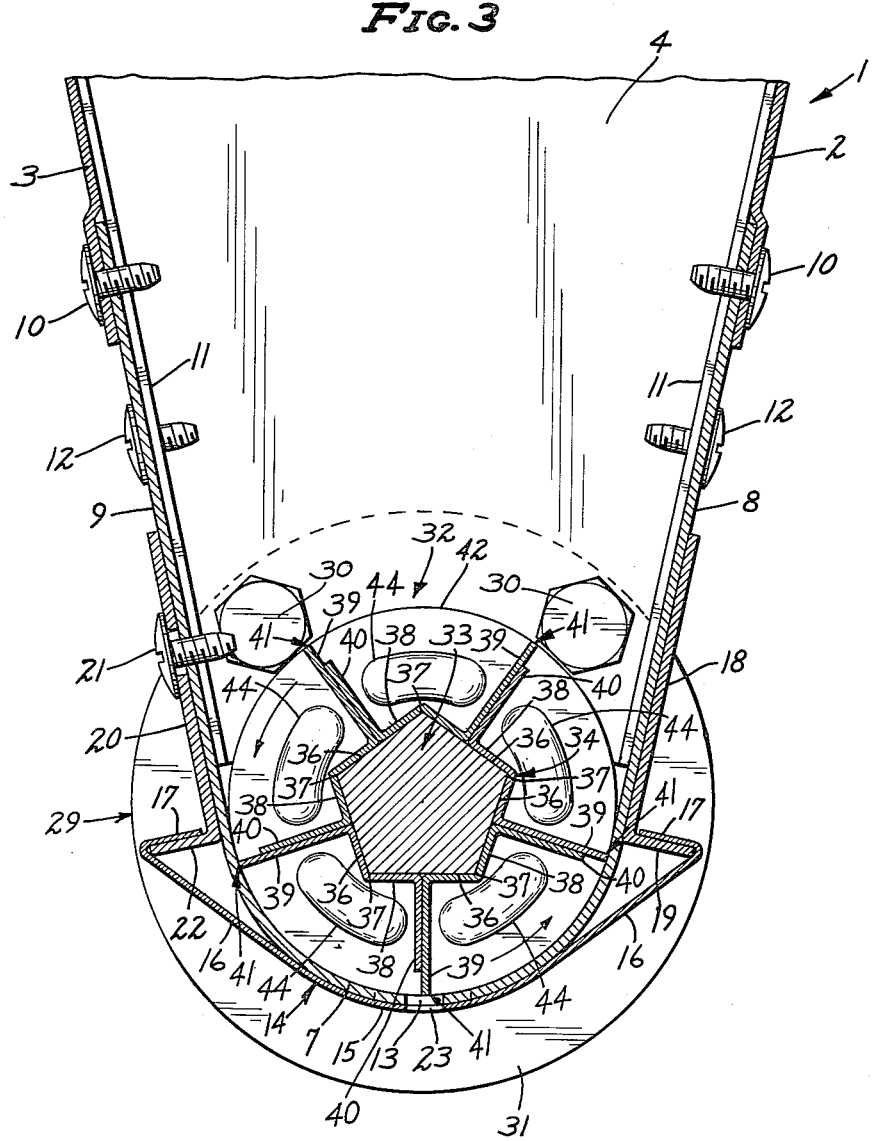

July 2, 1963 E. S. GANDRUD 3,096,004
HOPPER AND FEEDING ROTOR STRUCTURE FOR DISPENSERS
OF GRANULAR MATERIAL
Filed July 14, 1961 3 Sheets-Sheet 3

INVENTOR.
EBENHARD S. GANDRUD
BY
Merchant, Merchant & Gould
ATTORNEYS

United States Patent Office 3,096,004
Patented July 2, 1963

3,096,004
HOPPER AND FEEDING ROTOR STRUCTURE FOR DISPENSERS OF GRANULAR MATERIAL
Ebenhard S. Gandrud, % Gandy Co., 100 Gandrud Road, Owatonna, Minn.
Filed July 14, 1961, Ser. No. 125,042
4 Claims. (Cl. 222—410)

My present invention relates generally to applicators for distributing granular material such as dry granular chemicals, small seed, and the like, over a field, and more particularly to improvements in agitator and feeding rotor and hopper construction of these devices.

More specifically, my present invention relates to improvements in applicators of the general type disclosed in my United States Letters Patent No. 2,350,107, issued May 30, 1944, and No. 2,846,125, issued August 5, 1958.

Distributing devices for the purpose stated usually are provided with metering apertures at the bottom of a hopper through which material is discharged under action of gravity, and of a feeding rotor closely overlying the apertures. With many of these devices, feeding of the material is stopped both by closing the metering apertures and by stopping rotation of the feeding rotor, whereby to prevent undue agitation of the material and breaking or crushing of the granules of said material which otherwise occurs during rotation of the feeding rotor when the apertures are closed. During transport of the device from one field to another, when it is desired that discharge of the material be stopped, the operator merely uncouples the feeding rotor from its driving mechanism without closing the discharge or metering apertures. When this occurs, leakage of finely divided material from the hopper results in needless waste and expense.

An important function in present day agricultural practice includes that of control of noxious weeds and of insects that are injurious to life and growth of crops. For effective weed and insect control, a number of chemical preparations are available, many of these being applied to the ground, or to growing plants, in dry granular form. Obviously, to be most effective against certain plant and animal life, these chemicals must be toxic to such life, several of these are also injurious to human life and health as well, and extreme care must be exercised in the handling and distribution thereof. Therefore, leakage of such granular chemicals from the applicator at places other than fields where application of the material is desired, presents a definite hazard to persons coming into contact with such chemicals, until such time as the chemicals are leached or dissolved into the ground, or otherwise rendered harmless.

An important object of my invention is the provision of hopper and feeding rotor construction in which loss of material from the hopper is maintained at a minimum during non-operating periods of the device. To this end, I provide a hopper having side walls and a cross sectionally arcuate bottom wall portion and a feeding rotor journalled in the hopper on the axis of the arcuate bottom wall portion, the side walls having downwardly converging wall portions tangent to the arcuate bottom wall portion, the feeding rotor having a plurality of radial feeding vanes equally circumferentially spaced and extending substantially the length of said hopper, the radially outer edges of the vanes having only working clearance with the inner surface of the arcuate bottom wall portion, the angle defined by the converging side wall portions and the number of rotor vanes being such that a relatively small amount of the material in the hopper is exposed to the metering apertures during any given time interval, with the material in that portion of the hopper above the feeding rotor being substantially sealed off from the metering or discharge apertures when the feeding rotor is stationary, in any rotated position thereof.

Another object of my invention is the provision of a feeding rotor which is extremely rigid and which can be manufactured inexpensively and to close dimensional tolerances.

Still another object of my invention is the provision of a feeding rotor having novel means at the opposite end portions thereof for sealing the end portions thereof against flow of granular material from the ends of the hopper to the metering apertures in said arcuate bottom wall portion of the hopper.

The above, and still further highly important objects and advantages of my invention, will become apparent from the following detailed specification, appended claims and attached drawings.

Referring to the drawings, which illustrate the invention, and in which like reference characters indicate like parts throughout the several views:

FIG. 3 is an enlarged fragmentary transverse section taken substantially on the line 3—3 of FIG. 1;

Figure 1:
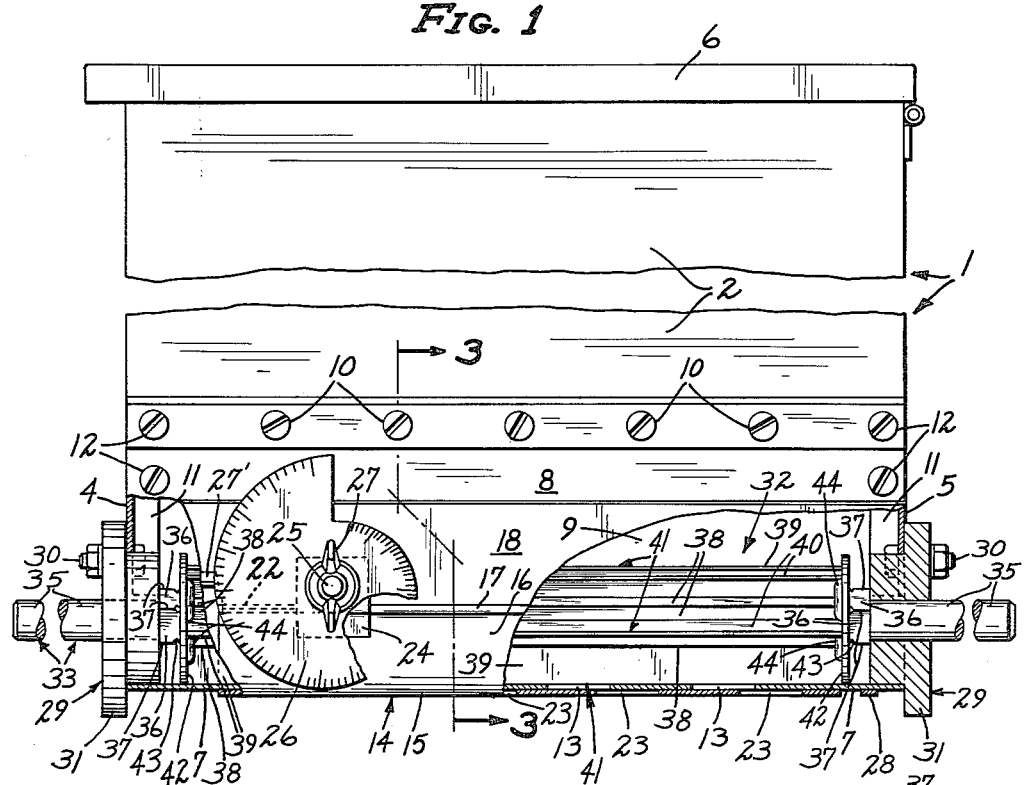
FIG. 1 is a view in side elevation of a spreading device for granular material, according to my invention, some parts being broken away and some parts being shown in section.
Figure 2:
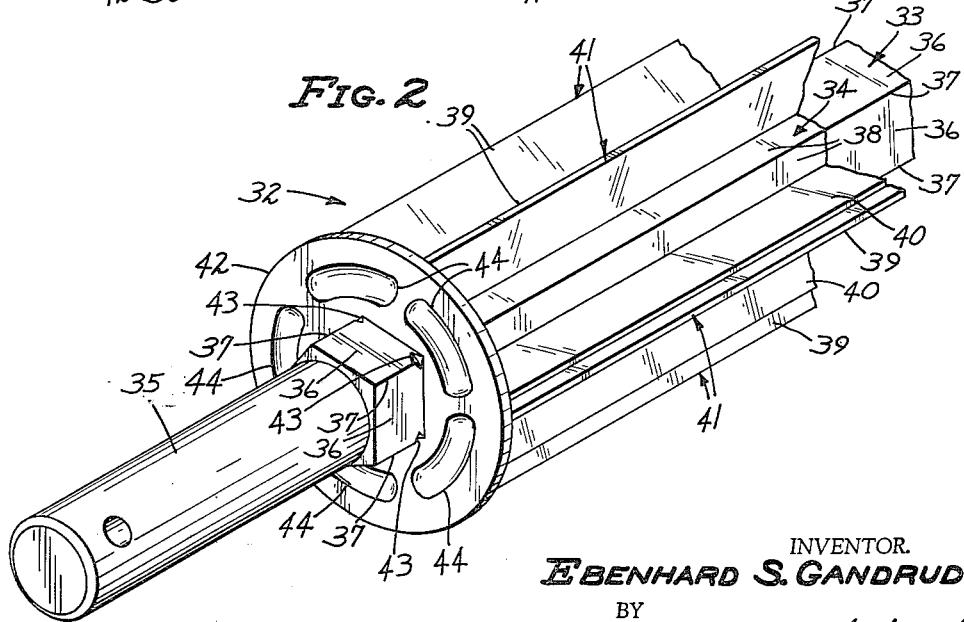
FIG. 2 is an enlarged fragmentary view in perspective of one end portion of the feeding rotor of my invention.

In the preferred embodiment of my invention illustrated in FIGS. 1–3, the numeral 1 indicates, in its entirety, a hopper comprising opposed side walls 2 and 3, end walls 4 and 5, a removable cover 6, and an arcuate bottom wall 7. The arcuate bottom wall 7 is formed to provide upwardly diverging side wall portions 8 and 9 that are tangent to the arcuate bottom wall portion 7 and which are rigidly secured at their upper edge portions to the side walls 2 and 3 respectively, by means of screws or the like 10. As shown particularly in FIG. 3, the upwardly diverging portions 8 and 9 are coplanar with their respective side walls 2 and 3, and form side wall extensions thereof. The end walls 4 and 5 are each provided with inturned flanges 11 to which are rigidly secured the opposite ends of the wall portions 8 and 9, by means of screws or the like 12. The side walls 2 and 3 are preferably welded or otherwise rigidly secured at their opposite ends to the flanges 11, to provide a rigid structure.

The arcuate bottom wall portion 7 of the hopper 1 is provided with a plurality of spaced discharged apertures 13 that are arranged in a row extending in a direction axially of said arcuate bottom wall portion 7. Preferably, the apertures 13 are elongated in said axial direction. Underlying the arcuate bottom wall portion 7 is a valve acting gate plate 14 that is formed to provide a cross sectionally arcuate intermediate portion 15 corresponding to the bottom wall portion 7, and upwardly diverging side portions 16, the outer edges of which are inturned to provide flanges 17. A mounting plate 18 is welded or otherwise rigidly secured to the side wall portion 8, and is provided with an out-turned longitudinally extending flange 19 that underlies and engages the adjacent flange 17 of the gate plate 14, see particularly FIG. 3. A similar mounting plate 20 is secured to the opposite side wall portion 9, by means of screws or the like 21, one of which is shown in FIG. 3, and by means of which the plate 20 may be adjusted upwardly and downwardly with respect to the wall portion 9. Like the mounting plate 18, the mounting plate 20 is formed to provide a longitudinally extended outwardly projecting flange 22 which underlies and supports the adjacent inturned flange 17 of the gate plate 14.

Like the arcuate bottom wall portion 7, the intermediate portion 15 of the gate plate 14 is provided with a plurality of openings 23 that are spaced apart in a row extending parallel to the row of discharge apertures 13. The openings 23 are of a size, shape and spacing corresponding to the discharge apertures 13, and are movable into and out of registration with the openings 13 responsive to sliding movements of the gate plate 14 relative to the hopper bottom 7. With reference to FIG. 1, it will be seen that the gate plate 14 has secured thereto a bracket 24 that is provided with a stud 25 on which is journalled a cam 26 that is releasably locked in any position of its rotation on the stud 25 by means of a wing nut 27 screw threaded on the stud 25. The cam 26 is adapted to engage an abutment in the nature of a flange 27' projecting laterally outwardly from the adjacent side wall portion 8, to limit movement of the gate plate in a direction to bring the openings 23 into registration with the discharge apertures 13. Rotary adjustment of the cam 26 controls the amount of registration between the openings 23 and apertures 13 between a minimum registration therebetween and full registration. The gate plate 14 is moved from the left to the right with respect to FIG. 1 to bring the openings 23 and apertures 13 into registration, movement of the gate plate 14 in the opposite direction to its limit of movement completely shutting off flow of material from the interior of the hopper 1. Movement of the gate plate 14 from the left to the right with respect to FIG. 1 is limited by engagement of the right hand end of the gate plate 14 with a stop lug or the like 28 suitably mounted on the hopper, such as on the hopper bottom portion 7.

A pair of bearing elements 29 are rigidly secured to the lower ends of the hopper end walls 4 and 5, by means of nut-equipped bolts or the like 30, and form downward extensions of said end walls 4 and 5, said bearings 29 having aligned axes that are coaxial with the axis of the arcuate hopper bottom wall 7. The bearings 29 are cylindrical in shape, and are provided with radially outwardly projecting circumferential flanges 31, the inner surfaces of which have abutting engagement with adjacent ends of the bottom wall portion 7 and lower ends of the wall portions 8 and 9 and end walls 4 and 5. Preferably, the bottoms of the end walls 4 and 5 are arcuate in shape, engaging the upper circumferential surface portions of the bearing elements 29.

A feeding rotor, indicated in its entirety by the reference numeral 32 comprises a central shaft 33 and a tubular body comprising a plurality of identical cooperating body sections 34. In the preferred embodiment of the invention illustrated in FIGS. 1–4, the shaft 33 is shown as being cross-sectionally pentagonal for the greater part of its length, the opposite end portions of the shaft 33 being cross sectionally circular to form axially extended trunnion elements 35 that extend axially through and are journalled in the bearings 29. A cross sectionally pentagonal portion of the shaft 33 is shown as having longitudinally extended plane surfaces 36 which cooperate to define longitudinally extended longitudinal corners or edges 37. The body sections 34 each comprise a longitudinally extended angular central portion 38 which overlies one of the longitudinal edges 37 of the shaft 33 and portions of adjacent plane surfaces 36 thereof. The opposite longitudinal edge portions of the body sections 34 are bent outwardly to provide longitudinally extended flanges 39 and 40 which project generally radially outwardly from the central shaft 33 and normal to the underlying plane surfaces 36 thereof. As shown in FIGS. 2 and 3, each flange 39 has a greater radial length than that of the flanges 40, and each flange 39 is contiguous with the flange 40 of an adjacent body section 34. Each pair of contiguous flanges 39 and 40 is spot welded or otherwise rigidly secured together in face-to-face engagement at longitudinally spaced points, preferably for the entire length of the rotor. In the producing of the rotor 32, it is preferable that the relative dimensions of the central shaft 33 and the central portions 38 of the several cooperating body sections 34 are such that, when the body sections 34 are applied to the shaft 33, the contiguous flanges 39 and 40 must be pulled into face-to-face engagement by suitable clamping means, not shown, before the cooperating flanges are welded or otherwise secured together. With this arrangement, the central shaft 33 is so tightly engaged by the tubular body that no other means need be employed to secure the same together against relative axial or circumferential movement.

Each pair of welded together flanges 39 and 40 cooperates to provide radial feeding vanes 41, of which there are five in number. The flanges 39 being of greater radial length than the flanges 40, the feeding vanes 41 are of greater thickness radially inwardly of their outer edge portions than at the outer edges thereof. This arrangement adds sufficient strength to the vanes to make the same extremely rigid, whereas the relative thinness of the outer edge portions thereof permits the rotor 32 to effectively feed material to the discharge apertures 13 in the hopper bottom 7 without permitting the material to be caught between the outer edges of the feeding vanes and the underlying inner surface of the hopper bottom 7. With reference to FIG. 3, it will be noted that the outer edges of the feeding vanes 41 are very closely spaced from the arcuate inner surface of the hopper bottom wall 7 to provide only working clearance therebetween and the inner surface of said arcuate bottom wall portion. In order to prevent granules of material in the hopper from becoming crushed between the outer edges of the vanes and the arcuate wall portion of the hopper, the above mentioned working clearance is less than the thickness or diameter of the granules of material normally distributed from the hopper. A pair of circular disc-like end walls 42 are mounted on the shaft 33, each in abutting engagement with a different end of the feeding vane 41, see FIGS. 1 and 2. The outer diameter of the end walls 42 is equal to that of a circle described by the outer edges of the feeding vanes 34, the end walls 42 being snugly received on the pentagonal portions of the shaft 33 and securely anchored in place by peening of the corners or edges 37 immediately axially outwardly of the end walls 42, as indicated at 43. Rigidity is added to the end walls 42 by forming the same with circumferentially spaced dimples or the like 44. The end walls 42 cooperate with the feeding vanes 41 to provide pockets which receive granular material in the hopper 1 and deliver the same to the discharge apertures 13.

Each of the trunnion elements 35 is adapted to have mounted thereon a drive gear, sprocket or the like, not shown, by means of which the feeding rotor 32 may be rotated from any suitable source of rotary movement on a mobile implement upon which the hopper 1 may be mounted. When it is desired to render the above-described device inoperative to spread granular material, while the implement upon which it is mounted is in operation, it is important that rotation of the feeding rotor 32 be stopped, whereby to eliminate waste of the granular material. While feeding of the material from the hopper 1 can be stopped by moving the valve acting gate plate 14 to its discharge aperture closed position against the stop lug 28, rotation of the rotor 32 should be stopped when the hopper bottom is closed to prevent undue grinding and crushing of the granular material within the hopper 1.

In view of the above, an important feature of my invention is the angular relationship between the upwardly diverging side wall portions 8 and 9 with respect to the number of feeding vanes 41 of the feeding rotor 32. In practice, when the user desires to stop the spreading operation, he merely uncouples the rotor shaft from the driving mechanism from the implement, either by a clutch or other suitable means, not shown. Generally, the user does not shift the valve-acting gate plate to a closed position, but relies on the stationary rotor to prevent material from being fed from the hopper 1 when feeding is not required, as when the implement is stationary, or being moved from one field to another. In spreaders of the type illustrated in my prior Patent 2,846,125, the feeding rotor must be stopped in one of a given limited number of rotated positions of the feeding vanes thereof, wherein a pair of adjacent feeding vanes seal off the discharge aperture from the material in the hopper above the feeding rotor. Often, the feeding rotor is stopped at a position of its rotary movement which will permit granules of material to escape downwardly between one of the feeding vanes and the adjacent side wall portion of the hopper, resulting in the waste of an unnecessary amount of the material from the hopper.

Figure 4:
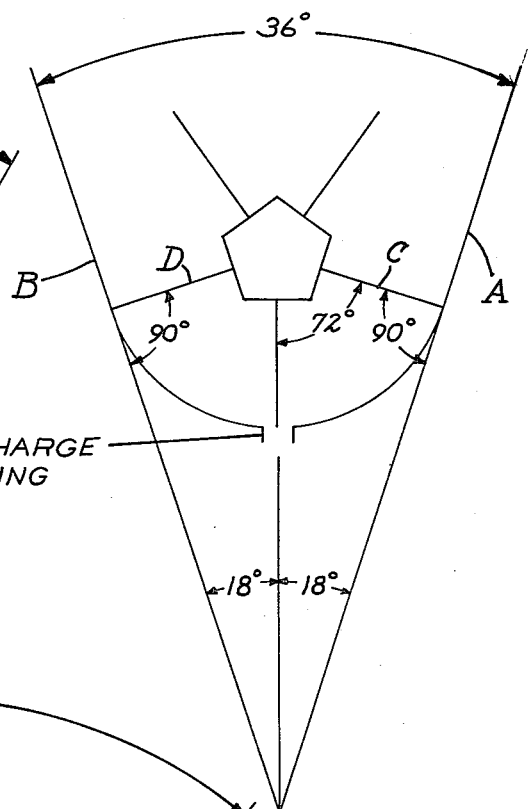
FIG. 4 is a diagrammatic view corresponding to FIG. 3 and illustrating the use of a formula for determining a maximum angular relationship between downwardly converging walls of a hopper having my feeding rotor mounted therein.

In order to maintain the loss of material from the hopper at a minimum during stationary periods of the equipment, and when the equipment is being moved from one field of operation to another, I provide a feeding rotor as above described, having at least five feeding vanes thereon in combination with a hopper having upwardly diverging side wall portions tangent to the arcuate bottom portion; with the angle between said side wall portions being such, relative to the angle between adjacent vanes of the feeding rotor and relative to the width of the feeding apertures in the direction of rotation of the feeding rotor, that the apertures are sealed off from that portion of the hopper above the rotor when the rotor is stationary and in any rotated position of the vanes thereof. With reference to FIG. 3 it will be seen that the width of the discharge apertures 13 and openings 23 is greater than the thickness of the radially outer edge portion of the feeding vanes 41, and that the feeding rotor 32 is disposed in a rotated position of the vanes thereof so that the greatest number of feeding vanes are required to seal off the discharge apertures from the material in the hopper above the feeding rotor. With the feeding rotor 32 in this position, and with the hopper having upwardly diverging side walls that are tangent to the arcuate bottom wall portion, I have found that, in order to seal off the discharge apertures from the upper portion of the hopper, the angle between the upwardly diverging side walls must have a given relationship to the angle between adjacent feeding vanes of the rotor 32. In the diagram of FIG. 4, the feeding vanes are positioned as in FIG. 3, and the downwardly converging or upwardly diverging side wall portions 8 and 9 are represented by the lines A and B, these lines being perpendicular to lines C and D respectively, the lines C and D representing two feeding vanes 41 of the rotor 32. The angle between the lines A and B has a sine equal to twice the sine of the angle between adjacent vanes of the feeding rotor multiplied by the cosine of the angle between said adjacent rotor vanes. In a feeding rotor having five feeding vanes, the angle between corresponding faces of adjacent feeding vanes equals 72°. The sine of 72° equals 0.95106. Twice this sine equals 1.90212. The cosine of 72° equals 0.30902. The product of these two figures equals 0.58779, this being the sine of the angle between lines A and B. This is the sine of a 36° angle. Hence, with a five vaned rotor, the angle between the downwardly converging side wall portions 8 and 9 should be 36° minus an angle defined by radial lines extending from the axis of the rotor to opposite sides of the discharge aperture 13. In actual practice, utilizing a five vaned rotor, I dispose the side wall portions 8 and 9 with an angle therebetween of 28°, which angle is sufficient to provide a free flow of material from the upper portion of the hopper 1 to the feeding rotor 32, and to effectively seal off the discharge apertures 13 from that portion of the hopper 1 above the rotor 32 when the rotor is stationary and in any rotated position of the vanes thereof. By arranging the side wall portions 8 and 9 in tangential realtionship to the arcuate bottom wall portion 7, bridging of material above the feeding rotor 32 is virtually eliminated.

The above-described angular relationship between the downwardly converging side wall portions 8 and 9 and the structure of the feeding rotor 32 results in the loss of but a minimum of material from the hopper when the feeding rotor 32 is stationary. With the feeding rotor 32 in its most disadvantageous position shown in FIGS. 3 and 4, only material from two of the pockets defined by adjacent feeding vanes will be lost during transport of the hopper from one location to another. In most instances, the rotor 32 will be stopped with two adjacent vanes 41 in straddling relationship to the row of discharge apertures 13, in which case only the material from one of the pockets defined by adjacent feeding vanes, will be lost. The rotor end walls 42 are disposed longitudinally outwardly of opposite ends of the row of discharge apertures 13 and effectively prevent granular material in the hopper from gaining access to the discharge apertures 13 from the ends of the rotor 32.

Figure 5:
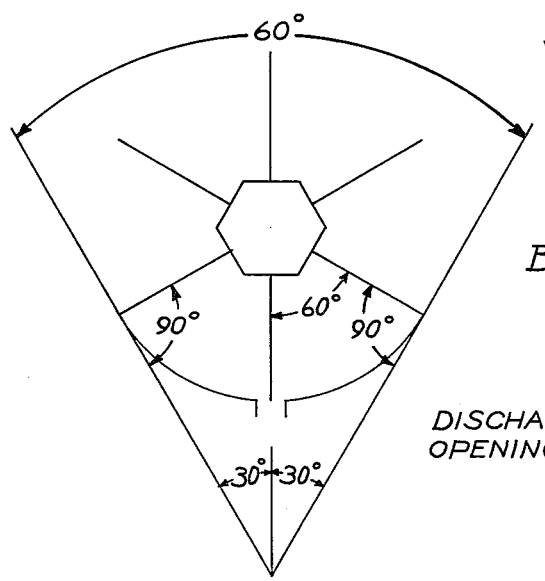
FIGS. 5 and 6 are diagrammatic views corresponding generally to FIG. 4 but illustrating the use of the formula 4 modified arrangements.
Figure 6:
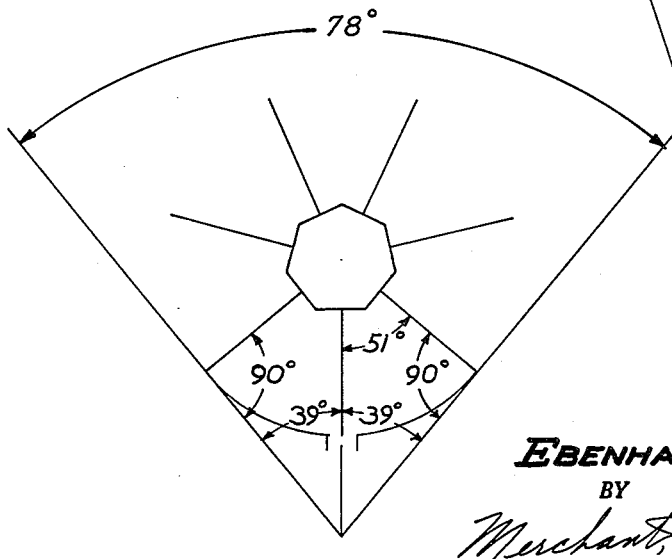

The diagrams of FIGS. 5 and 6 illustrate the manner in which the above formula is utilized in determining the angles at which the downwardly converging side wall portions of the hopper may be disposed, when feeding rotors having six and seven feeding vanes are utilized. When using a six vaned rotor, a theoretical angle of 60° may be used, minus the angular measurement of the width of the discharge apertures. With a seven vaned rotor, a theoretical angle of 78° between the downwardly converging hopper side walls may be utilized, minus the angular measurement of the width of the discharge apertures. Thus, it will be seen that, as the number of feeding vanes increases, the angle between the downwardly converging side wall portions may also be increased without sacrificing the sealing effect of the feeding rotor as above described.

With the use of the above described applicator structure, I am able to apply toxic granular chemicals to a field of crop plants to eliminate noxious weeds and injurious insect life therefrom, with a minimum danger to persons or animal life which may otherwise be affected by coming into contact with the toxic material when the same is scattered indiscriminately.

My invention has been thoroughly tested and found to be completely satisfactory for the accomplishment of the objectives set forth; and, while I have shown and described a commercial embodiment of my present applicator structure, it will be understood that the same is capable of modification without departure from the spirit and scope of the invention, as defined in the claims.

What I claim is:

1. In a device of the kind described, a hopper having end walls and a pair of opposed side walls, and a cross sectionally arcuate bottom wall portion, a feeding rotor rotatably mounted in said end on the axis of said arcuate bottom wall, said side walls having downwardly converging portions both being tangent to said arcuate bottom wall portion, said bottom wall portion having a plurality of discharge openings arranged in a row in an axial direction, said rotor having at least five equally spaced radially extending vanes cooperating with said bottom wall portion to move material through said apertures, the angle of convergence of the side wall portions and the number of radial vanes being so related that at least two vanes cooperate with the arcuate portion at all times, with one on either side, circumferentially of said apertures to seal the hopper from the apertures.

2. The structure as defined in claim 1 including a pair of disc members, one at each end of the rotor, each having a diameter equal to the diameter of the circle described by the outer edges of the vanes.

3. The structure as defined in claim 2 wherein the disc members are provided with inwardly facing dimples to add rigidity thereto.

4. The structure as defined in claim 2 wherein the angle between the downwardly converging side wall portions is less than an angle having a sine equal to twice the sine of the angle between adjacent vanes of the feeding rotor multiplied by the cosine of the angle between said adjacent rotor vanes.

References Cited in the file of this patent

UNITED STATES PATENTS

| | | |
|---|---|---|
| 2,350,107 | Gandrud | May 30, 1944 |
| 2,710,116 | Juzwiak | June 7, 1955 |
| 2,736,467 | Durand | Feb. 28, 1956 |
| 2,846,125 | Gandrud | Aug. 5, 1958 |
| 2,899,111 | Christensen | Aug. 11, 1959 |